USO05555788A

United States Patent [19]
Gakhar et al.

[11] Patent Number: 5,555,788
[45] Date of Patent: Sep. 17, 1996

[54] SAW BLADE

[75] Inventors: Ved P. Gakhar; Donald C. Pennington, Jr.; David H. Byrley; Alexander Grishin; Richard A. Dossett; Manfred W. Schmidt, all of Louisville, Ky.

[73] Assignee: Credo Tool Company, Woodburn, Oreg.

[21] Appl. No.: 410,078

[22] Filed: Mar. 29, 1995

[51] Int. Cl.⁶ .............................. B23D 61/02; B27B 33/08
[52] U.S. Cl. ................................... 83/835; 83/676
[58] Field of Search ................ 83/835, 676, 848, 83/849, 850, 851, 852, 854, 855, 837

[56] References Cited

U.S. PATENT DOCUMENTS

| | | |
|---|---|---|
| 212,813 | 3/1879 | Miller . |
| 1,083,645 | 1/1914 | Wettstein ................... 83/835 |
| 3,496,973 | 2/1970 | Ballard ...................... 83/835 |
| 4,574,676 | 3/1986 | Jansen-Herfeld ............ 83/835 |
| 5,182,976 | 2/1993 | Wittkopp .................... 83/835 |
| 5,438,900 | 8/1995 | Sundstrom .................. 83/835 |

FOREIGN PATENT DOCUMENTS

| | | |
|---|---|---|
| 20025 | 3/1915 | Denmark . |
| 1050987 | 2/1959 | Germany ................... 83/835 |
| 0292118 | 12/1990 | Japan ....................... 83/835 |
| 4002410 | 1/1992 | Japan ....................... 83/835 |
| 905075 | 2/1982 | U.S.S.R. . |
| 8501242 | 3/1985 | WIPO ....................... 83/835 |
| 8705556 | 9/1987 | WIPO ....................... 83/835 |
| WO93/08969 | 5/1993 | WIPO . |

OTHER PUBLICATIONS

Advertisement by "Freud", date unknown.

Primary Examiner—Eugenia Jones
Attorney, Agent, or Firm—Middleton & Reutlinger; James C. Eaves, Jr.

[57] ABSTRACT

A circular saw blade with improved stability, the blade having a plurality of radial expansion slots, preferably having a "J"-shape. The blades may also have a plurality of arced body slots and may be coated with a "TEFLON" paint mixture.

13 Claims, 20 Drawing Sheets

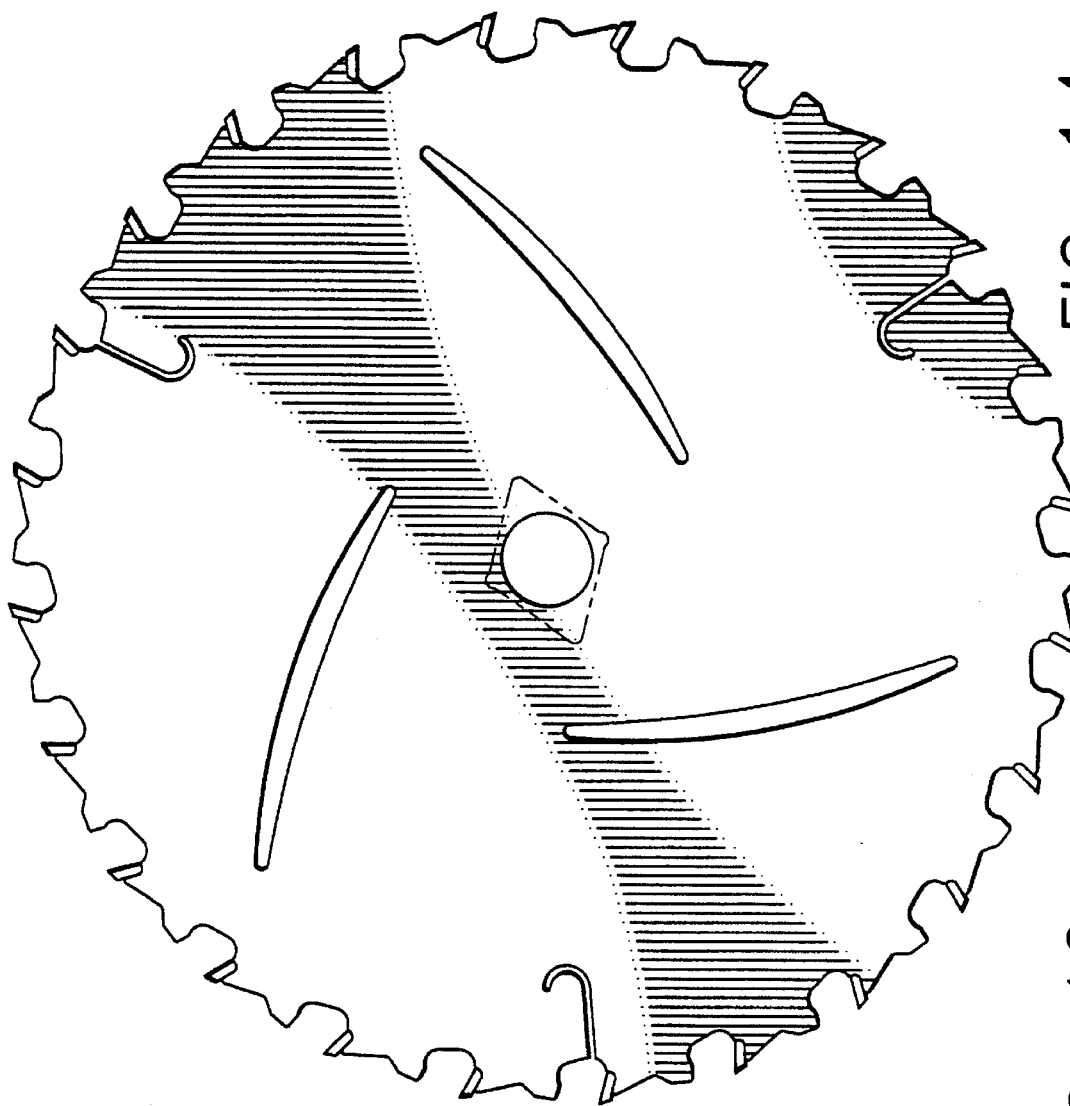
FIG. 14
FIG. 12
FIG. 10

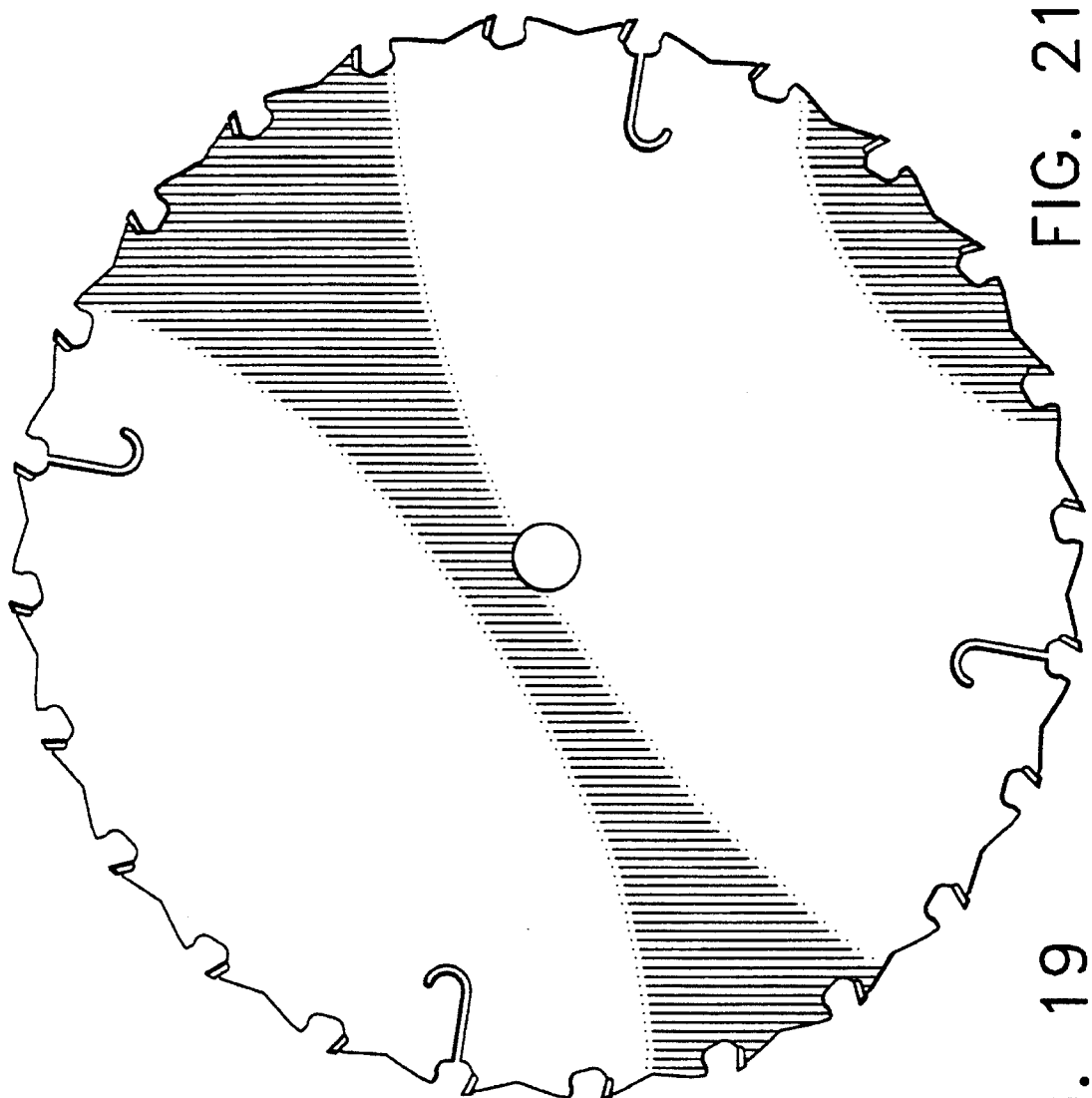
FIG. 21
FIG. 19
FIG. 17
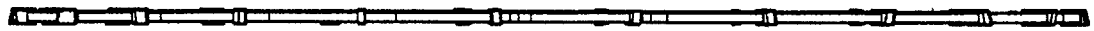

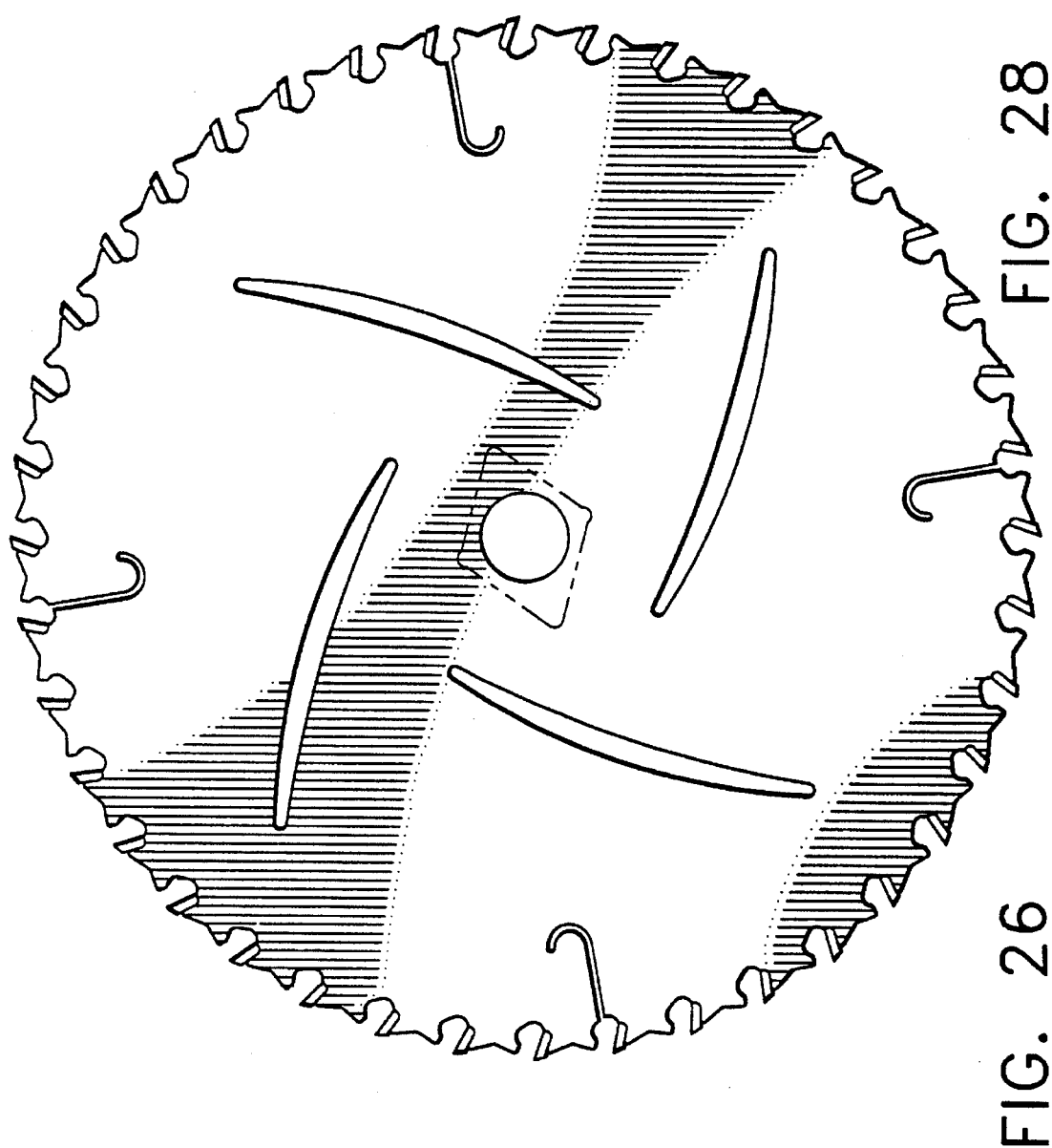
FIG. 28
FIG. 26
FIG. 24

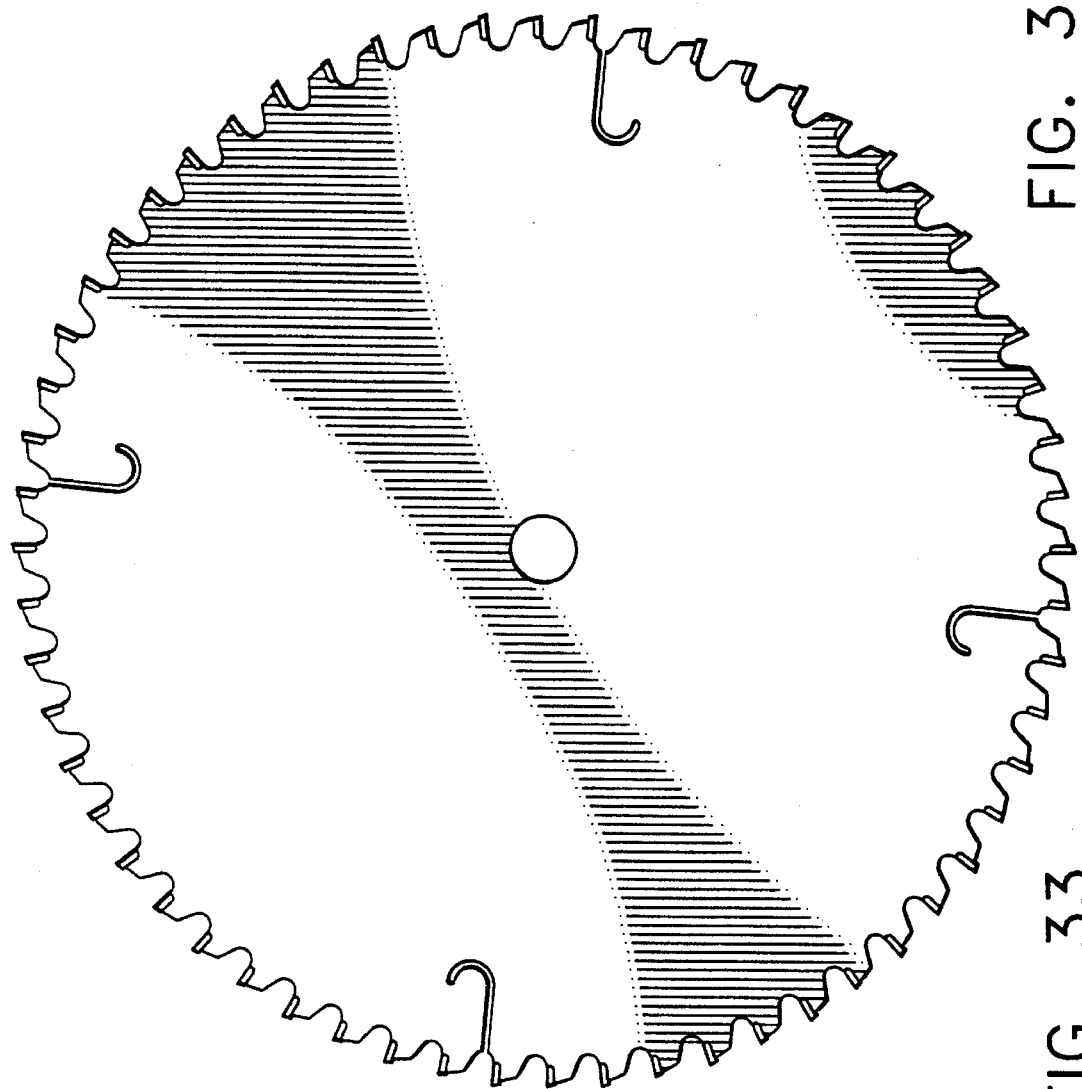
FIG. 35
FIG. 33
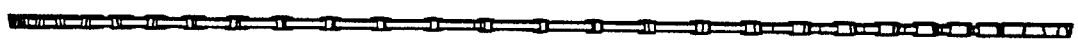
FIG. 31

SAW BLADE

BACKGROUND OF THE INVENTION

1. Field of the Invention

The present invention relates to a circular saw blade with improved stability, the blade having a plurality of radial expansion slots, preferably having a "J"-shape. The blades may also have a plurality of arced body slots and may be coated with a "TEFLON" paint mixture. "TEFLON" is a trademark of DuPont.

2. Discussion of the Prior Art

U.S. Pat. No. 212,813, of 1879, to Miller, teaches a circular saw having a plurality of body slots, each slot which extend from a location toward the blade circumference toward the blade center. The slots may be radial or arced (See FIG. 4).

U.S. Pat. No. 1,083,645, of 1914, to Wettstein, teaches a circular saw blade having a large number of body slots or perforations "d". Danish Patent 20025, of 1915, teaches a circular saw blade having many small body slots placed at various blade locations.

German Auslegeschrift 1,050,987, of 1959, teaches a circular saw blade having irregularly arranged body slots for noise reduction. U.S.S.R. patent specification 905,075, of 1982, teaches a circular saw blade having a plurality of body slots, each slot starting at a location toward the blade circumference and have a logarithmetic spiral toward the blade center.

U.S. Pat. No. 5,182,976, of 1993, to Wittkopp, teaches a circular saw blade having a plurality of body slots. FIGS. 1A and 1B show slots having two sides with equal radius arcs, the slots having stops "S" extending thereinto.

PCT published application WO/85/01242, of 1985, teaches a prior art blade of FIG. 1 having a plurality of inwardly extending radial milled slots 4 of a width, the slots 4 each terminate inwardly in a circular opening 5, having a diameter larger than slot 4's width, the opening 5 being filled with a copper plug 6. At FIG. 2, a plurality of relatively very narrow width slits 10, for example 0.005–0.006 inch (0.013–0.015 cm) wide, are taught. These slits 10 terminate in a stress stop 11 to appear like a question mark "?" or fish hook.

PCT published application WO93/08969, of 1993, teaches a saw blade having radial slots and tension distributing holes. Others have combined expansion slots and anti-vibration portions in blades. For example, "FREUD" advertises a blade having a plurality of different sized, non-uniformly spaced, "?" shaped slots having laser cut narrow reeds cut into the blade body.

SUMMARY OF THE INVENTION

The present invention is for a circular saw blade having stable operating characteristics and provides ease of cut, increased durability, quality of cut, reduced blade buckling, and reduced blade operating noise. The present invention relates to both circular blades of "smaller" diameter which are used with portable saws and circular blades of "larger" diameter which are used with table saws. Generally, the blades have a central circular bore therethrough for receiving an arbor. Depending on the saw for which the blade is to be used, central circular or diamond shaped knockouts can be provided.

The larger blades have a plurality of equally spaced external "J" shaped expansion slots, each slot extending radially inward a preselected distance and then turning in a semi-circle or arc of a preselected radius in the direction of rotation to form the "J". Because of the ease of manufacture, Applicants wanted slots which would be punched into the blades. While prior art references teach unique small width noise reducing slot designs which must be cut into the blade, these small width design configurations can not be punched into the blade blanks. Instead, more complicated and time consuming processes must be used.

With prior art non-J punched slots, for example, the radial slot terminating in a circular opening, noise is generated by the rapidly turning blade. For stamped openings of similar width, Applicants note that the J shape seems to cause less high frequency whistle.

Being used generally on table saws such as a radial or miter/compound miter saw, these "larger" blades are either fixed with the lumber to be cut being moved over the blade, for example, with a rip saw; or are guidable in a single selected direction with the lumber to be cut being fixed, for example, with a radial arm saw. Because of these configurations, it is generally only the cutting tips which are engaging the lumber to be cut. The J slots provide ample space for expansion of the blade because of the heat generated during cutting. Also, these "larger" blades, generally having a higher tooth count for trimming or finishing work, usually receive less abusive usage and generate less heat.

With the "smaller" diameter blades being used on portable saws, in sawing, some operators may not cut in a straight line. Therefore, more of the blade than just the saw tips may engage the lumber to be cut. This causes more heat at locations other than the tips. Further, this can put more stresses on the blade. Therefore, as will be explained in more detail later, body slots are included on these "smaller" blades. The same number of J slots and body slots are included on each blade.

Each circular saw blade has a natural frequency which, assuming a solid disk, is affected by the blade diameter, the blade thickness, the blade material of construction, and the size of the collar at the blade center. For example, the natural frequency of a blade can be made higher by using a larger diameter collar, making the blade thicker, or reducing the blade diameter, as all these changes make the blade stiffer.

Blades have critical speeds, where the blade can vibrate and be unstable. Ideally, the blade critical speed will be engineered to be far from the operating speed. The natural frequencies of each of the nodal diameters have a forward and a backward travelling wave, which have some cancellation effect to maintain blade stability. The operating speed at which the backward travelling wave is zero is the critical speed. For example, the following blade parameters were measured:

| Blade Number | 1 | 2 | 3 |
| --- | --- | --- | --- |
| Blade Diameter | 7.25 in | 10 in | 12 in |
|  | 18.4 cm | 25.4 cm | 30.5 cm |
| Blade Thickness | .048 in | .064 in | .064 in |
|  | .122 cm | .163 cm | .163 cm |
| Arbor Bore Diameter | .625 in | 1.0 in | 1.0 in |
|  | 1.59 cm | 2.54 cm | 2.54 cm |
| Collar Diameter | 2.0 in | 2.0 in | 2.0 in |
|  | 5.1 cm | 5.1 cm | 5.1 cm |
| Least Critical Speed | 12272 rpm | 7563 rpm | 4981 rpm |

For blades 1 and 2, the operating speed could be, for example, 5600 rpm and, for blade 3, the operating speed could be 3800 rpm. However, without radial expansion slots and body slots, for the solid saw blade disk, the heat generated during cutting moves radially toward blade center. When looking at a temperature plot of a solid blade, one would see a plurality of concentric circles, the inner circles being a lesser temperature than the outer circles. It is this temperature distribution and lack of a place for expansion that can result in blade warping or cupping. Adding J slots and body slots can alter this concentric temperature distribution and provide for uniform expansion across a major portion of the radius, however, introducing J slots and body slots makes the blade less stiff and reduces the natural frequency of the blade. The more slots the lower the frequency. Therefore, too many slots can lower the frequency too much and result in an unstable blade at the operating speed. Applicants have determined that 3 or 4 J slots and body slots provide enough expansion area, but do not reduce the blade stiffness enough to make the blade unstable. Also, an arced body slot with two opposed sides of different radius which do not have its two ends in radially alignment on the blade provide better stiffness.

Finally, the present invention comprises a blade for a circular saw having a body of a generally circular shape, the body having a preselected blade thickness, the body having a peripheral surface having a preselected shape, the peripheral surface having a plurality of cutting teeth connected thereto for cutting in a cutting direction, the blade having a center arbor bore therethrough, the blade having an imaginary blade center point, the blade having at least three and not more than four identical J expansion slots therein, the J expansion slots having an equal spacing therebetween about said peripheral surface, each J expansion slot having a preselected opening width, the opening width being at least equal to the blade thickness, each J expansion slot having a radial portion and an arcuate portion, the radial portion extending radially inward from the peripheral surface toward the imaginary blade center point for a preselected distance to a closest radial location, the arcuate portion starting at the closest radial location and arcing in the cutting direction, the arcuate portion having a preselected radius and an imaginary arc center point, the imaginary arc center point having a blade location between the peripheral surface and the arcuate portion, the arcuate portion having a J slot closest location to the imaginary blade center point.

BRIEF DESCRIPTION OF THE DRAWINGS

A better understanding of the invention will be had upon reference to the following description in conjunction with the accompanying drawings in which like numerals refer to like parts and wherein:

FIG. 10 is a left side view of the saw blade of FIG. 9;

FIG. 12 is a right side view of the saw blade of FIG. 9;

FIG. 14 is a back view of the saw blade of FIG. 8;

FIG. 17 is a left side view of the saw blade of FIG. 16;

FIG. 19 is a right side view of the saw blade of FIG. 16;

FIG. 21 is a back view of the saw blade of FIG. 15;

FIG. 24 is a left side view of the saw blade of FIG. 23;

FIG. 26 is a right side view of the saw blade of FIG. 23;

FIG. 28 is a back view of the saw blade of FIG. 22;

FIG. 31 is a left side view of the saw blade of FIG. 30;

FIG. 33 is a right side view of the saw blade of FIG. 30;

FIG. 35 is a back view of the saw blade of FIG. 29;

DETAILED DESCRIPTION OF THE PREFERRED EMBODIMENT

Figure 1:
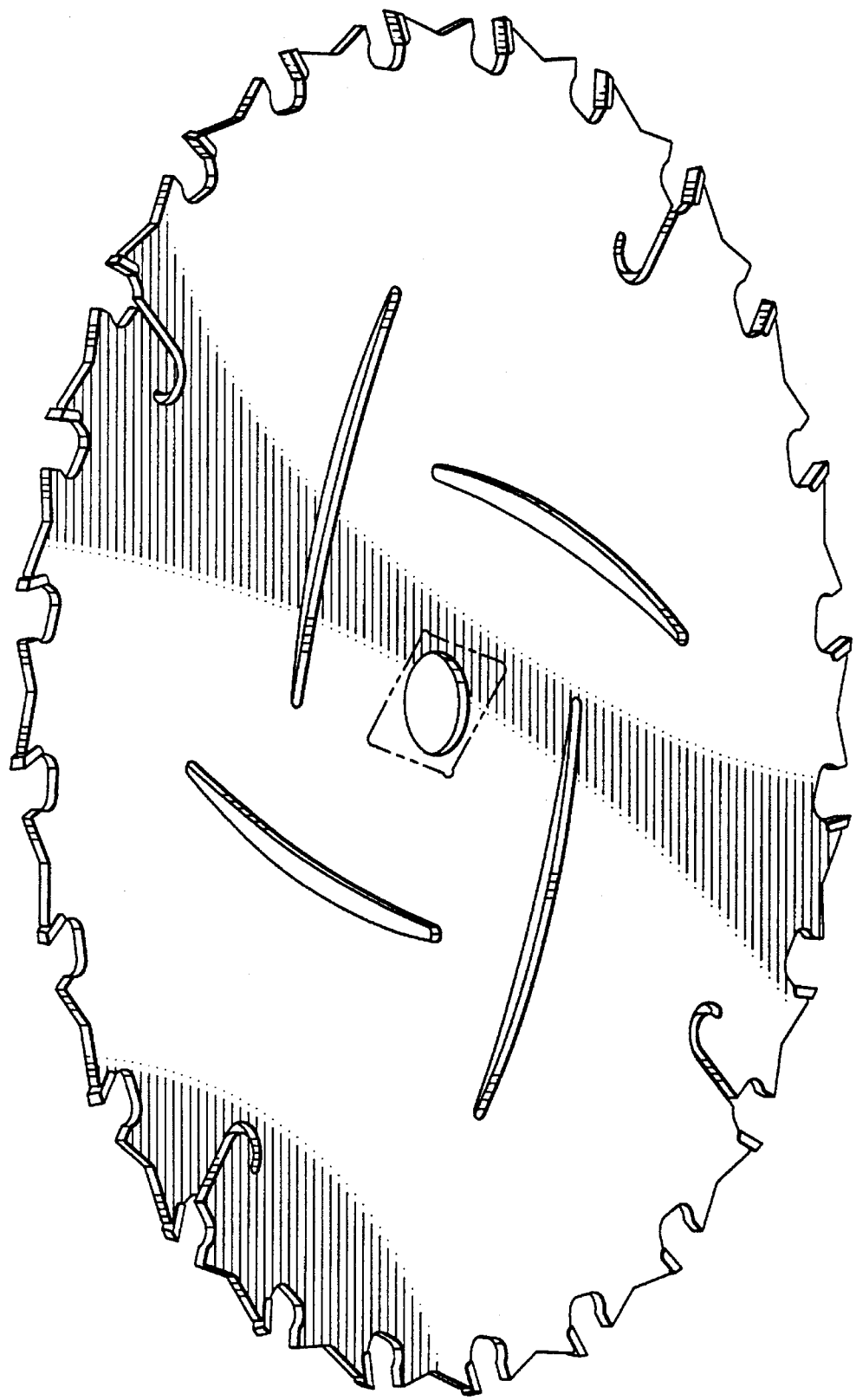
FIG. 1 is a front left side elevational perspective view on a reduced scale of a first saw blade made in accordance with the present invention.
Figures 2, 4, 6:
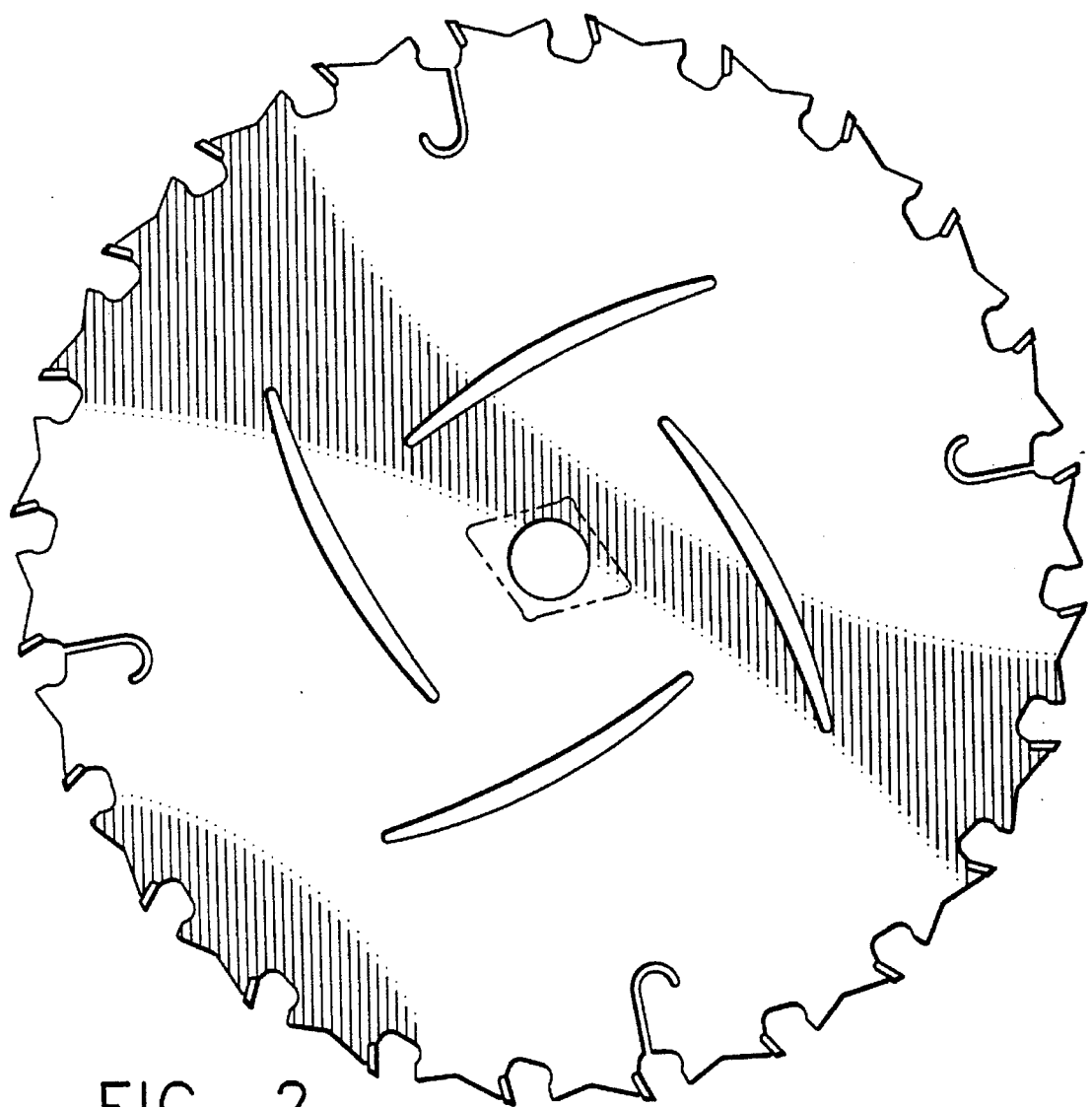
FIG. 2 is a front view of the saw blade of FIG. 1.
FIG. 4 is a top side view of the saw blade of FIG. 2.
FIG. 6 is a bottom side view of the saw blade of FIG. 2.
Figures 3, 5, 7:
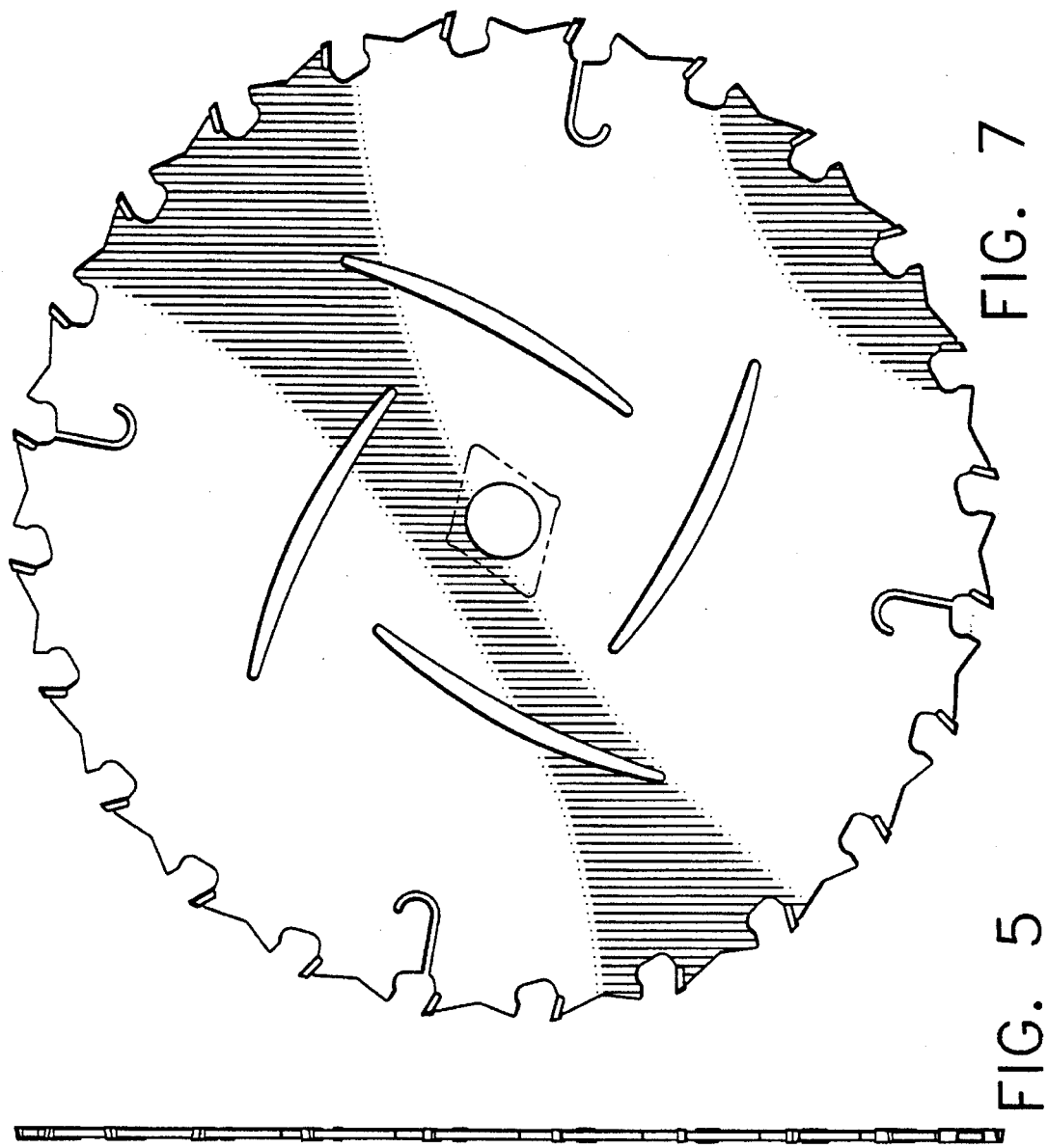
FIG. 3 is a left side view of the saw blade of FIG. 2.
FIG. 5 is a right side view of the saw blade of FIG. 2.
FIG. 7 is a back view of the saw blade of FIG. 1.
Figure 8:
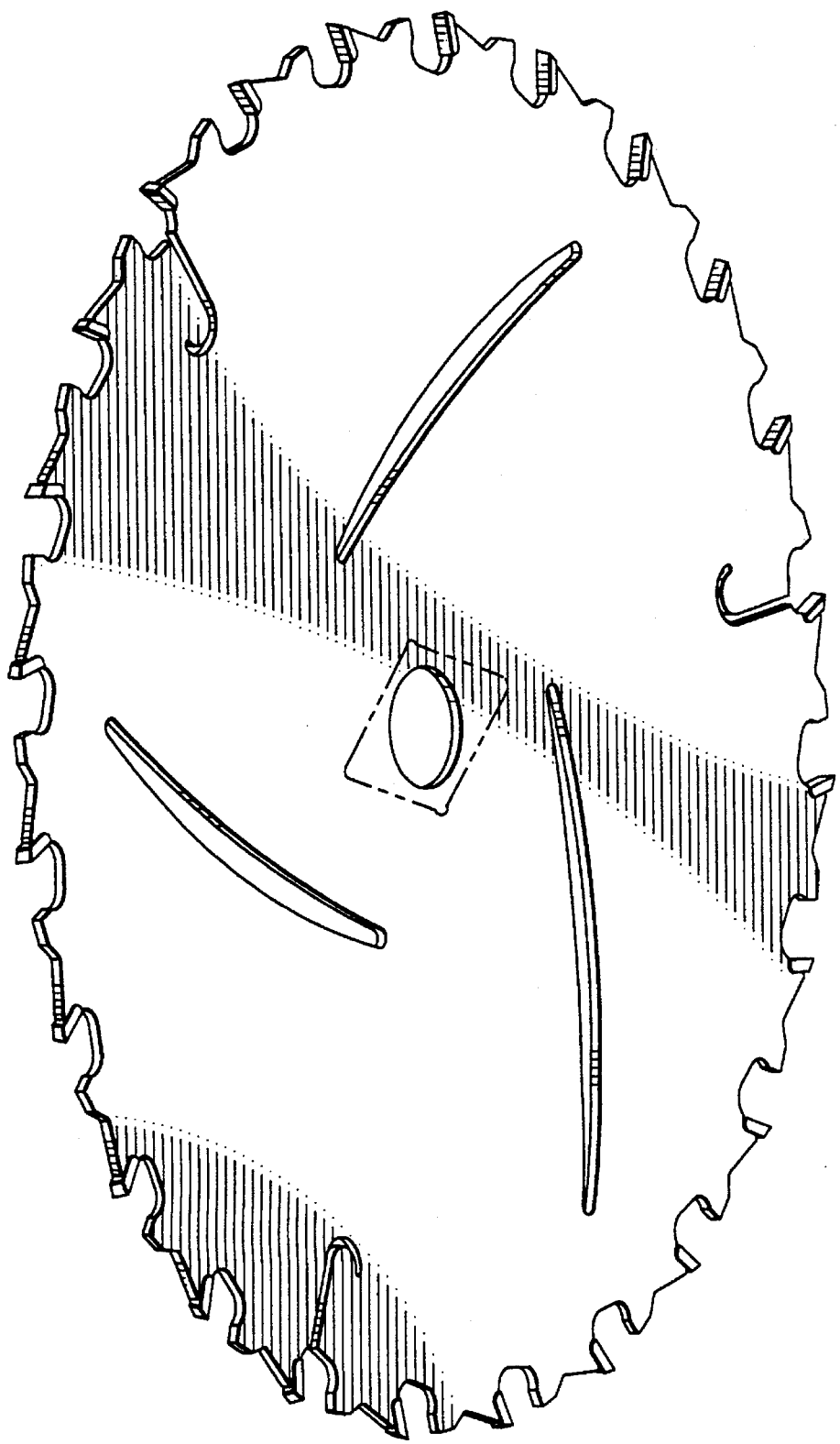
FIG. 8 is a front left side elevational perspective view on a reduced scale of a second saw blade made in accordance with the present invention.
Figures 9, 11, 13:
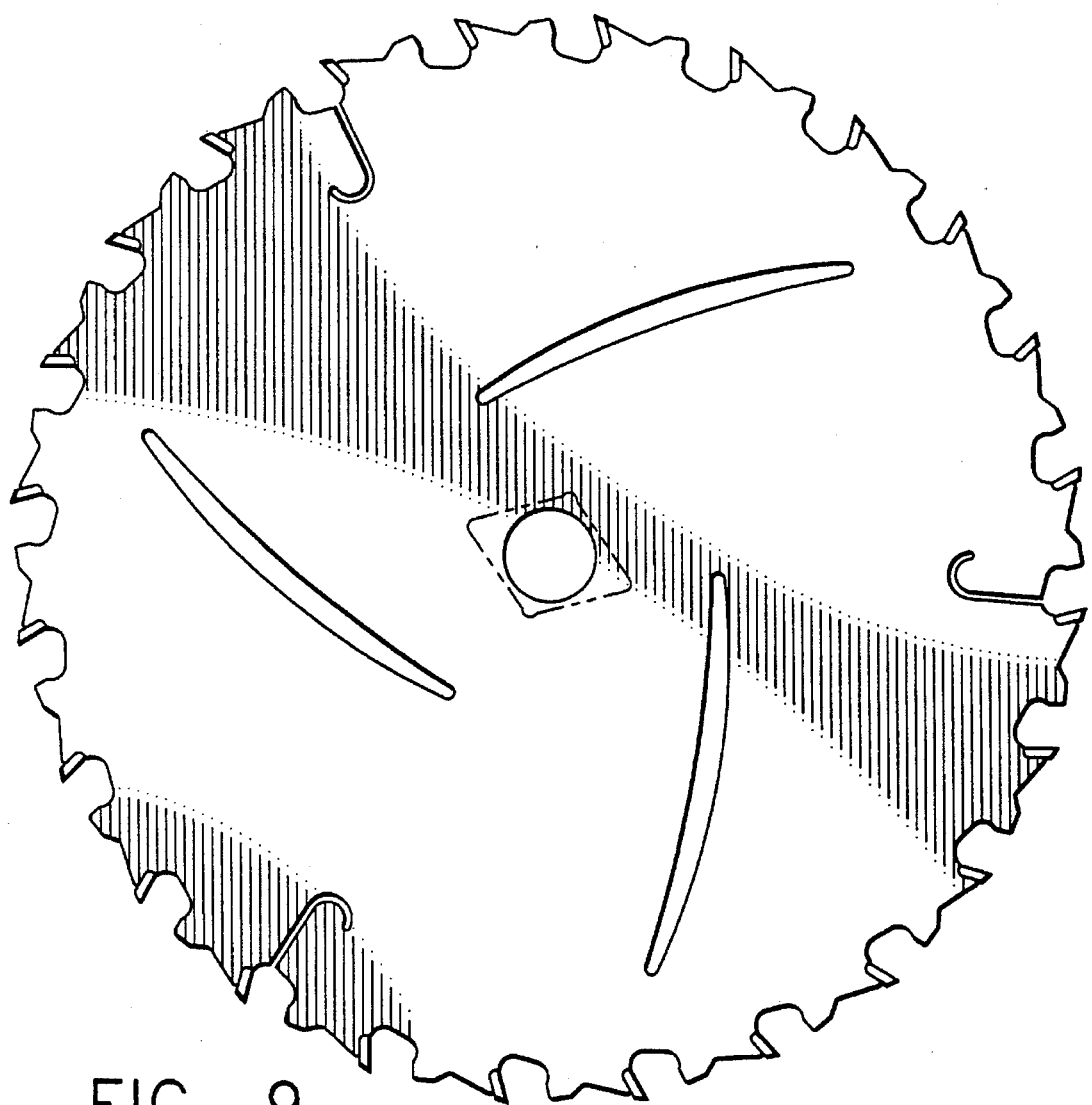
FIG. 9 is a front view of the saw blade of FIG. 8.
FIG. 11 is a top side view of the saw blade of FIG. 9.
FIG. 13 is a bottom side view of the saw blade of FIG. 9.
Figure 15:
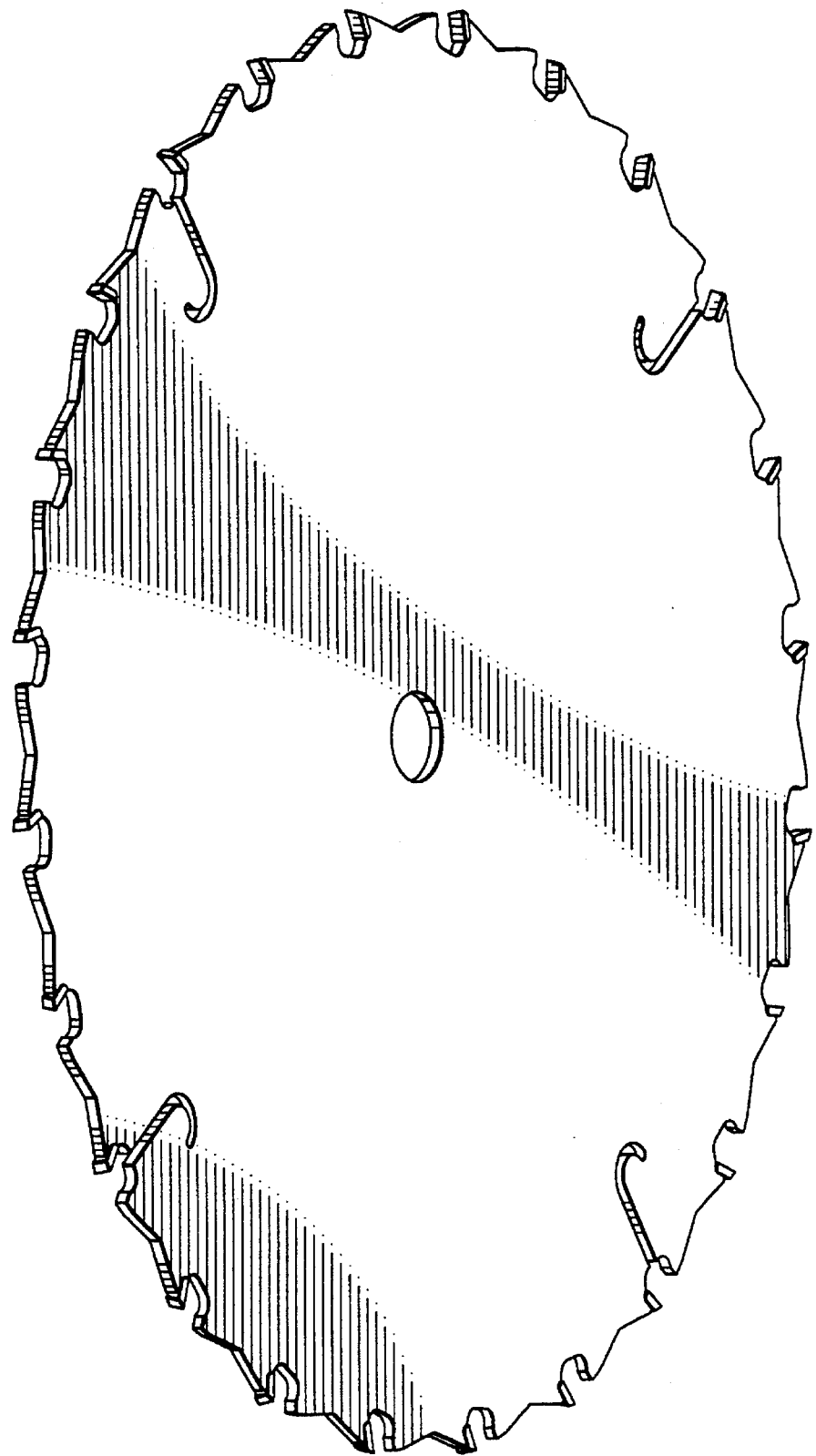
FIG. 15 is a front left side elevational perspective view on a reduced scale of a third saw blade made in accordance with the present invention.
Figure 20:
FIG. 20 is a bottom side view of the saw blade of FIG. 16.
Figure 16:
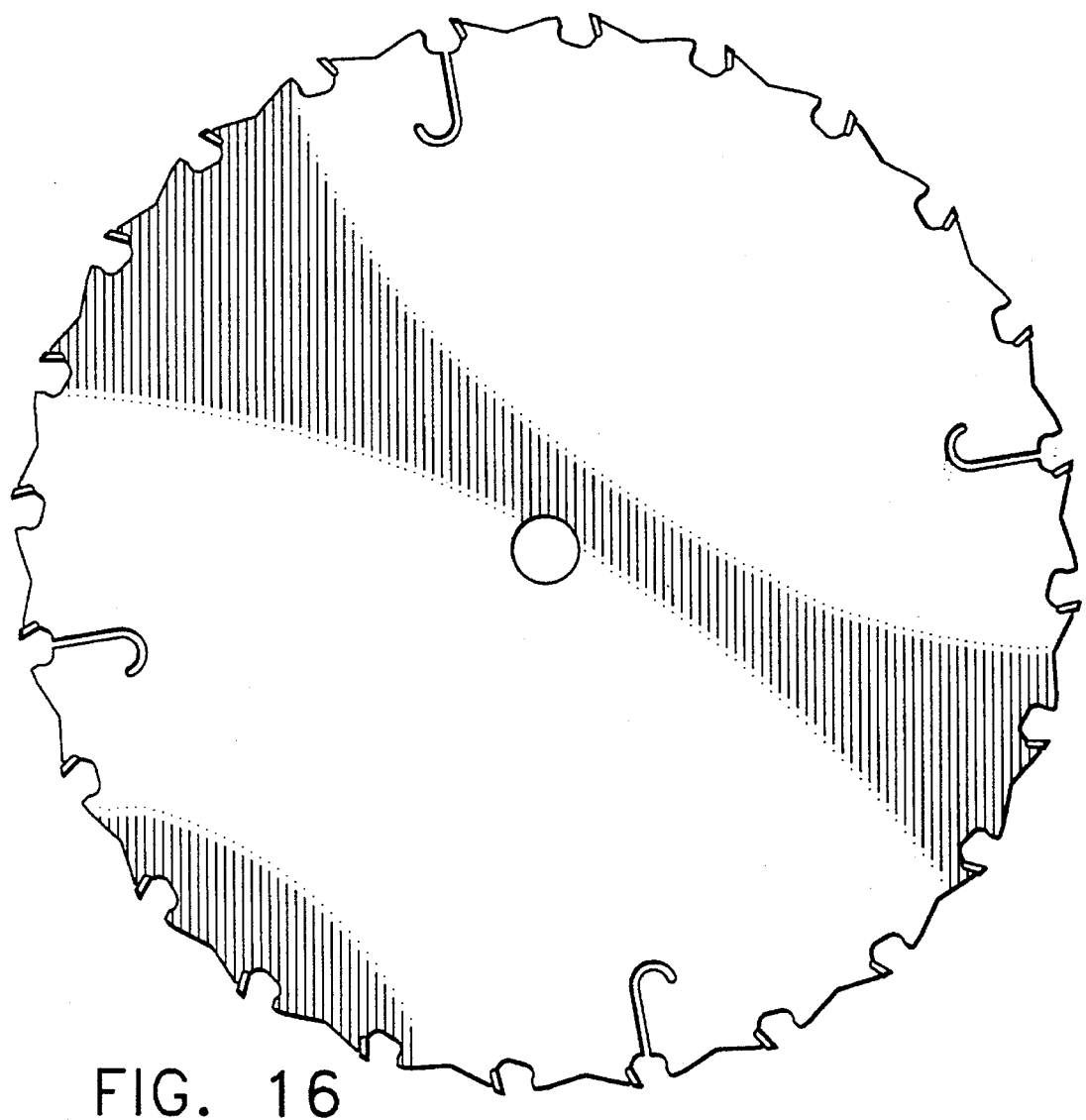
FIG. 16 is a front view of the saw blade of FIG. 15.
Figure 18:
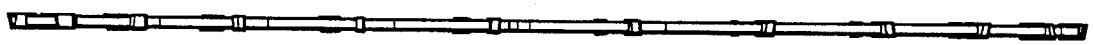
FIG. 18 is a top side view of the saw blade of FIG. 16.
Figure 22:
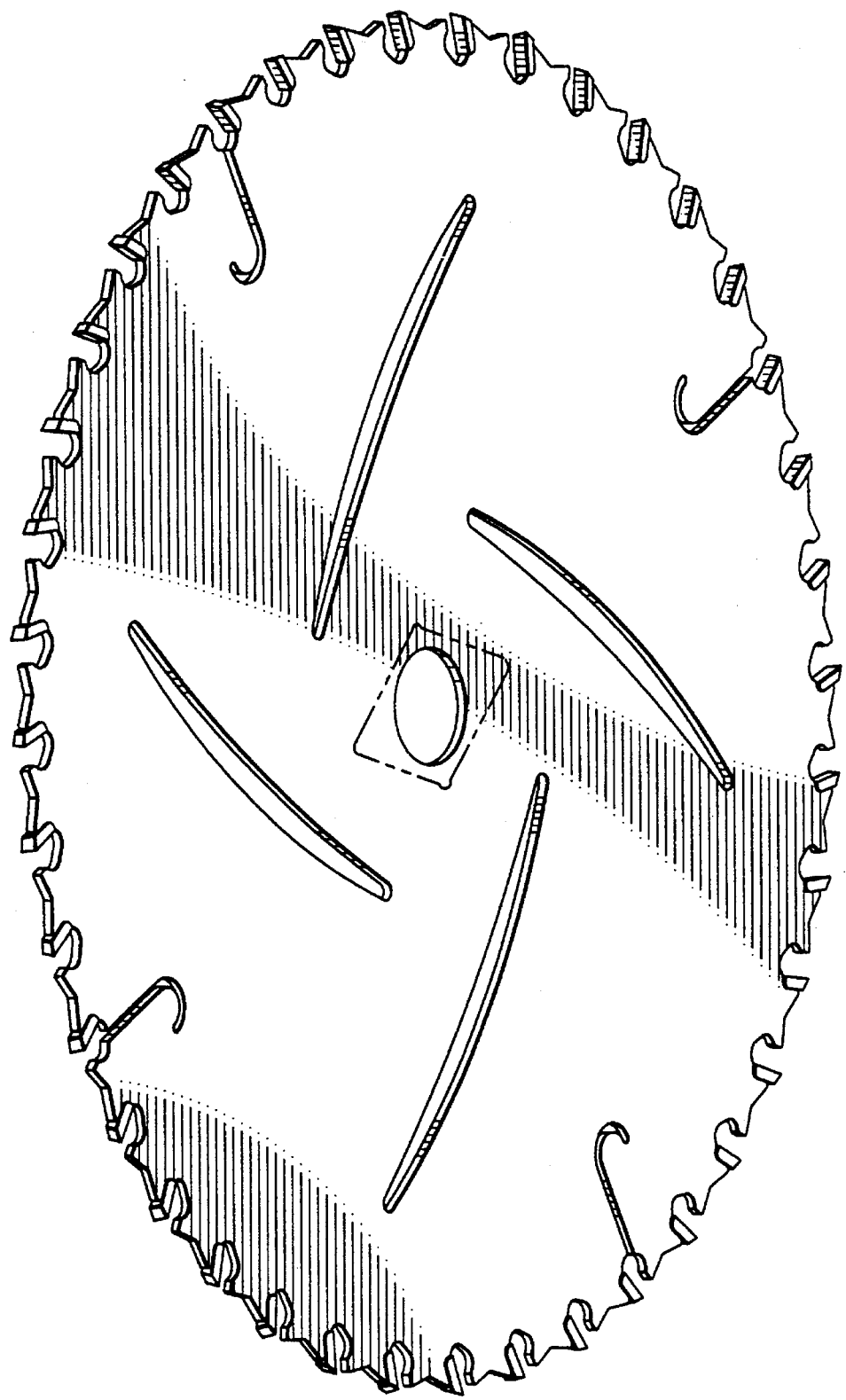
FIG. 22 is a front left side elevational perspective view on a reduced scale of a fourth saw blade made in accordance with the present invention.
Figures 23, 25, 27:
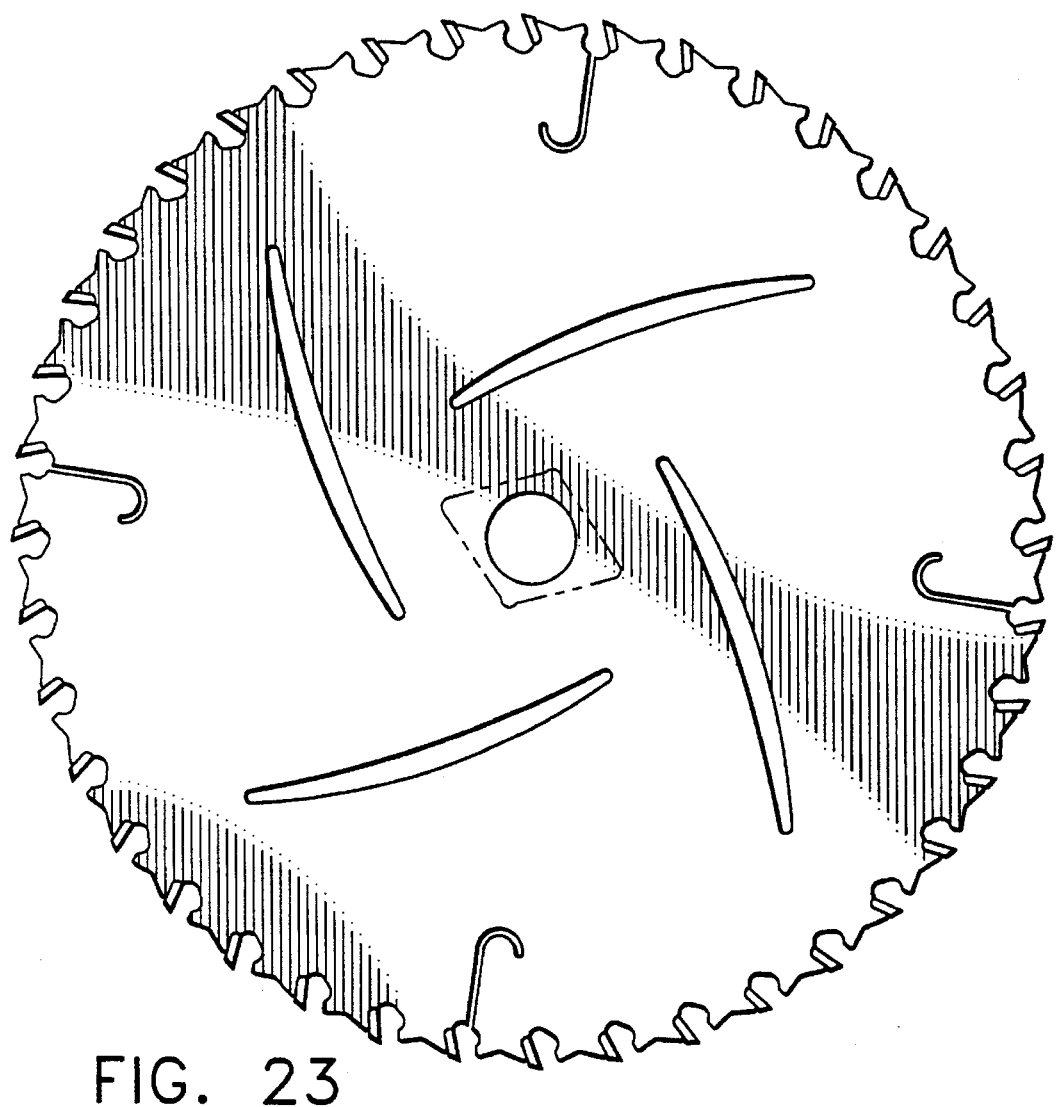
FIG. 23 is a front view of the saw blade of FIG. 22.
FIG. 25 is a top side view of the saw blade of FIG. 23.
FIG. 27 is a bottom side view of the saw blade of FIG. 23.
Figure 29:
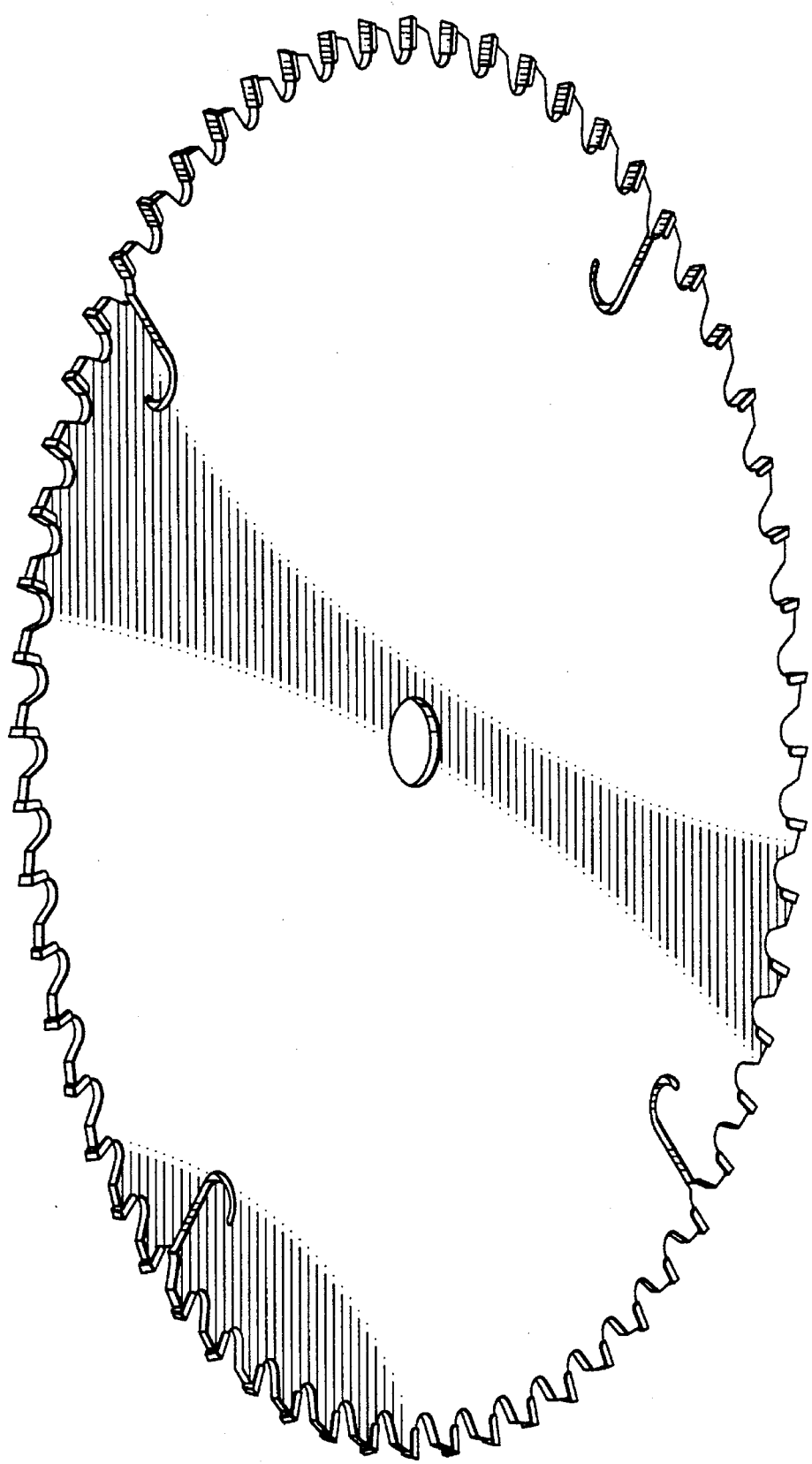
FIG. 29 is a front left side elevational perspective view on a reduced scale of a fifth saw blade made in accordance with the present invention.
Figure 34:
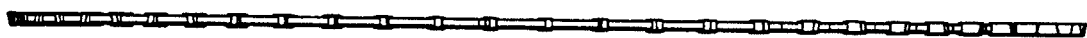
FIG. 34 is a bottom side view of the saw blade of FIG. 30.
Figure 30:
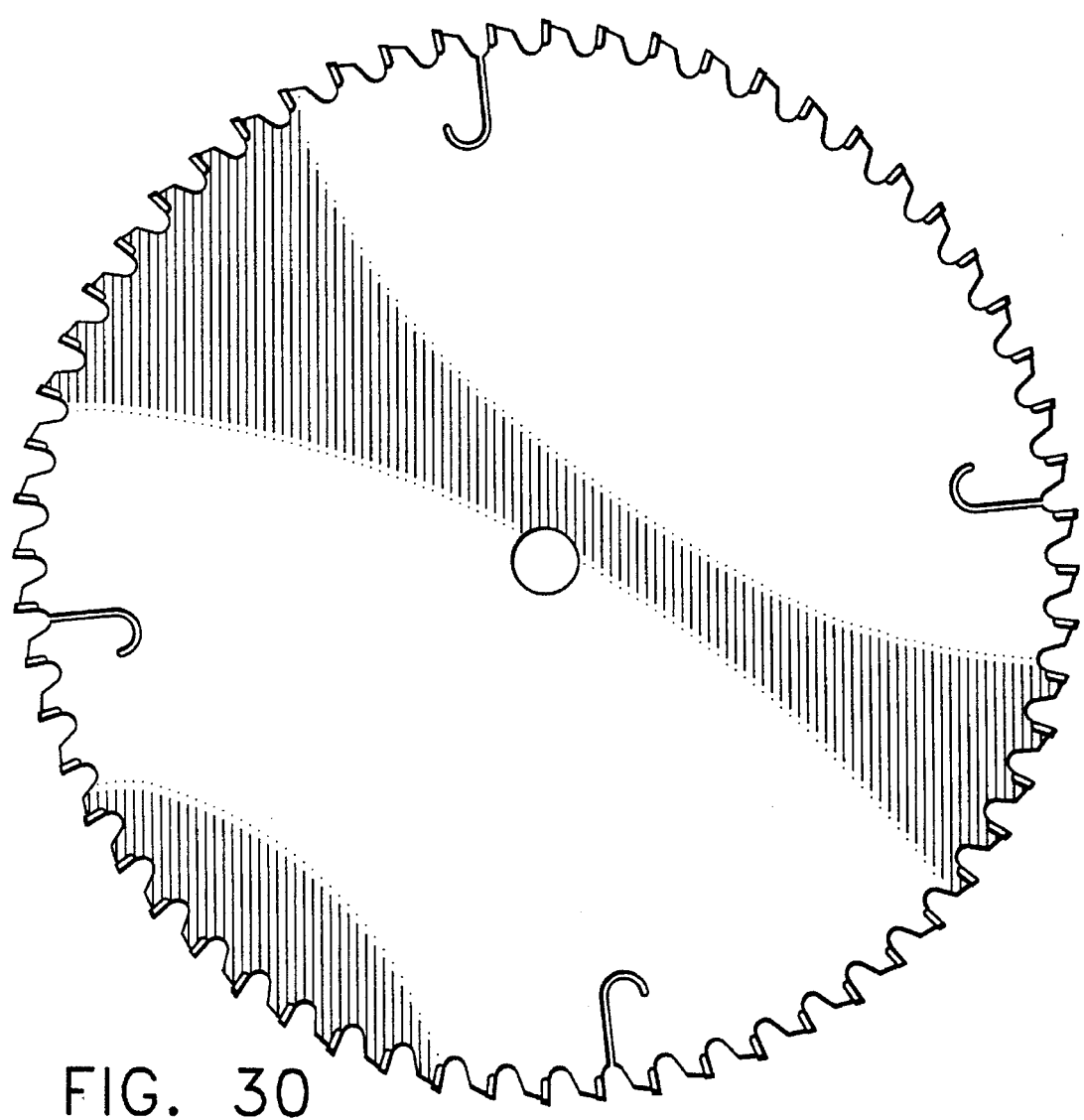
FIG. 30 is a front view of the saw blade of FIG. 29.
Figure 32:
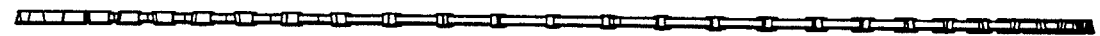
FIG. 32 is a top side view of the saw blade of FIG. 30.
Figure 36:
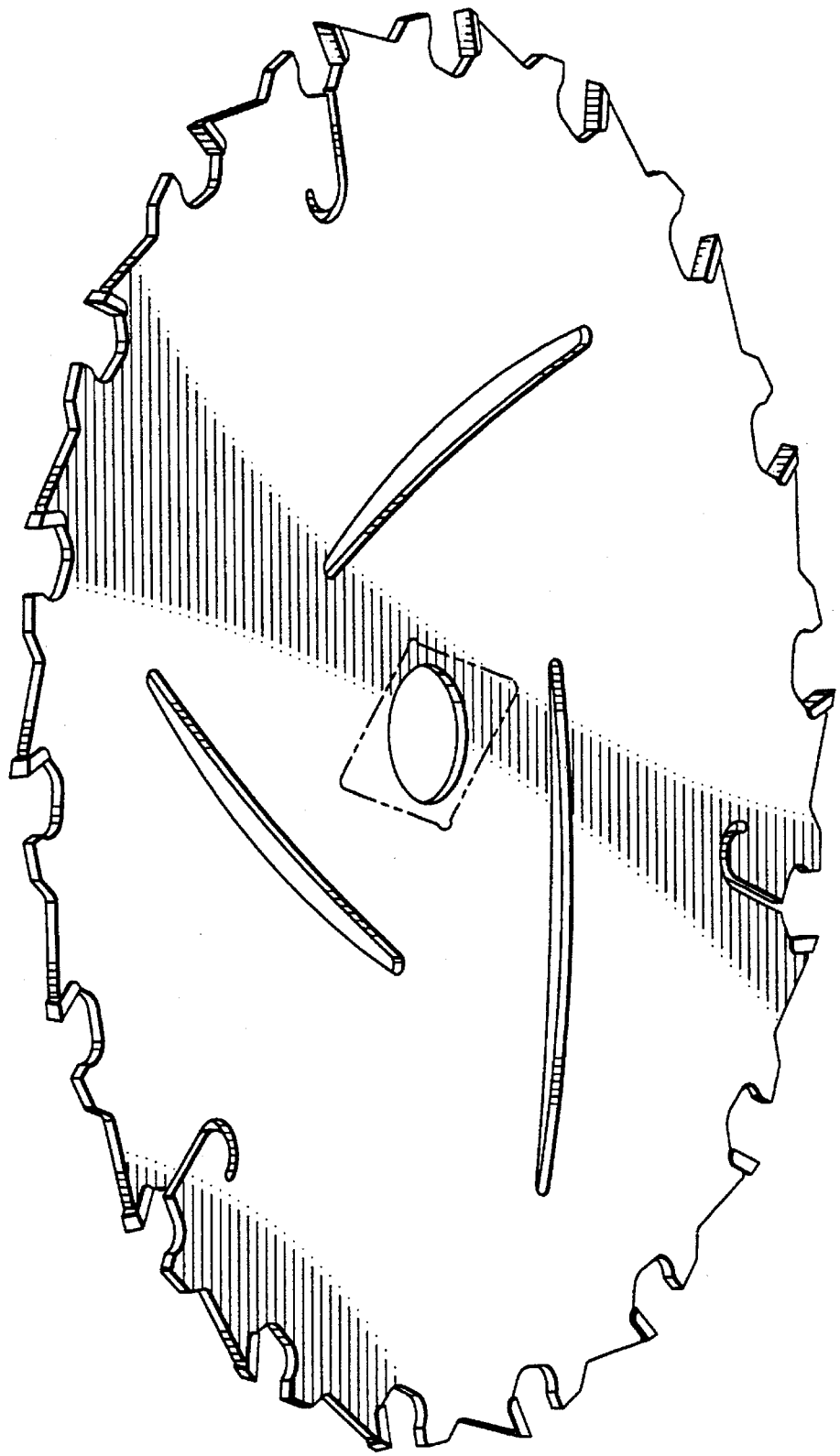
FIG. 36 is a front left side elevational perspective view on a reduced scale of a sixth saw blade made in accordance with the present invention.
Figure 41:
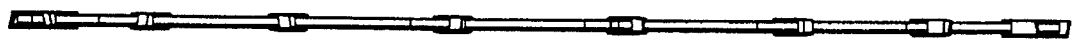
FIG. 41 is a bottom side view of the saw blade of FIG. 37.
Figure 37:
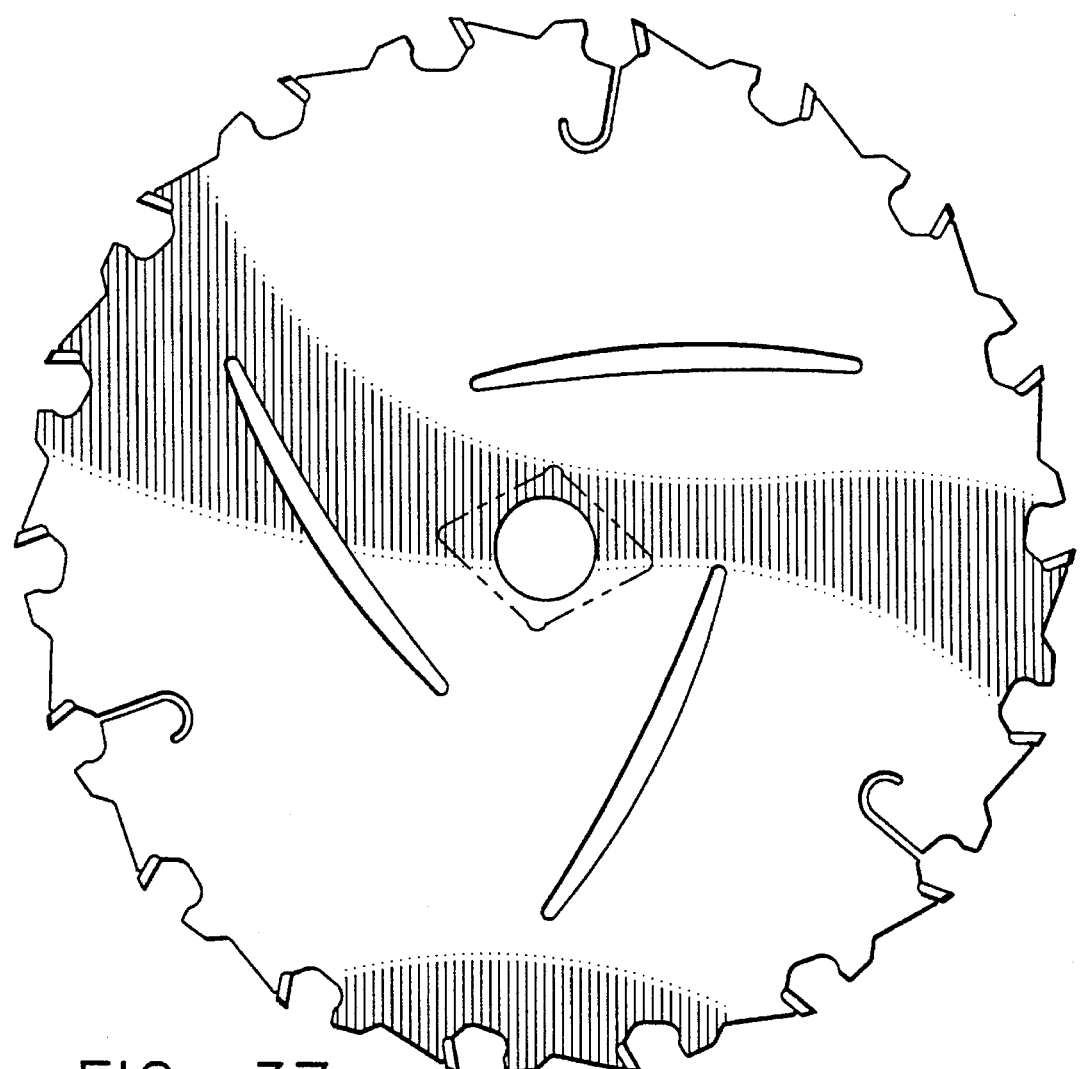
FIG. 37 is a front view of the saw blade of FIG. 36.
Figure 39:
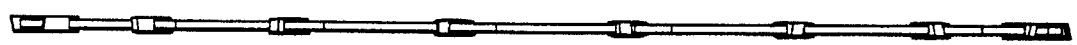
FIG. 39 is a top side view of the saw blade of FIG. 37.
Figure 42:
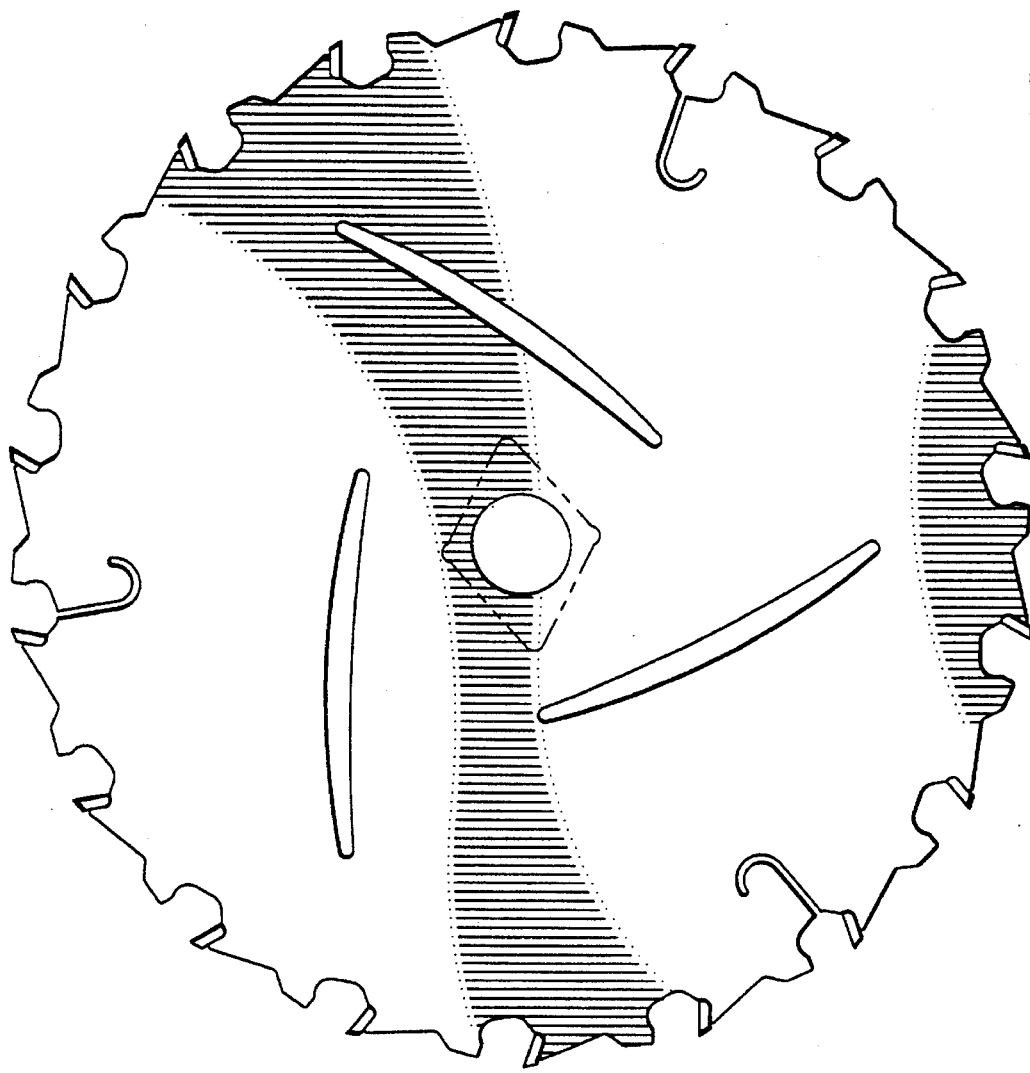
FIG. 42 is a back view of the saw blade of FIG. 36.
Figure 40:
FIG. 40 is a right side view of the saw blade of FIG. 37.
Figure 38:
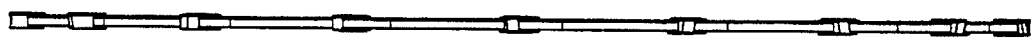
FIG. 38 is a left side view of the saw blade of FIG. 37.
Figure 43:
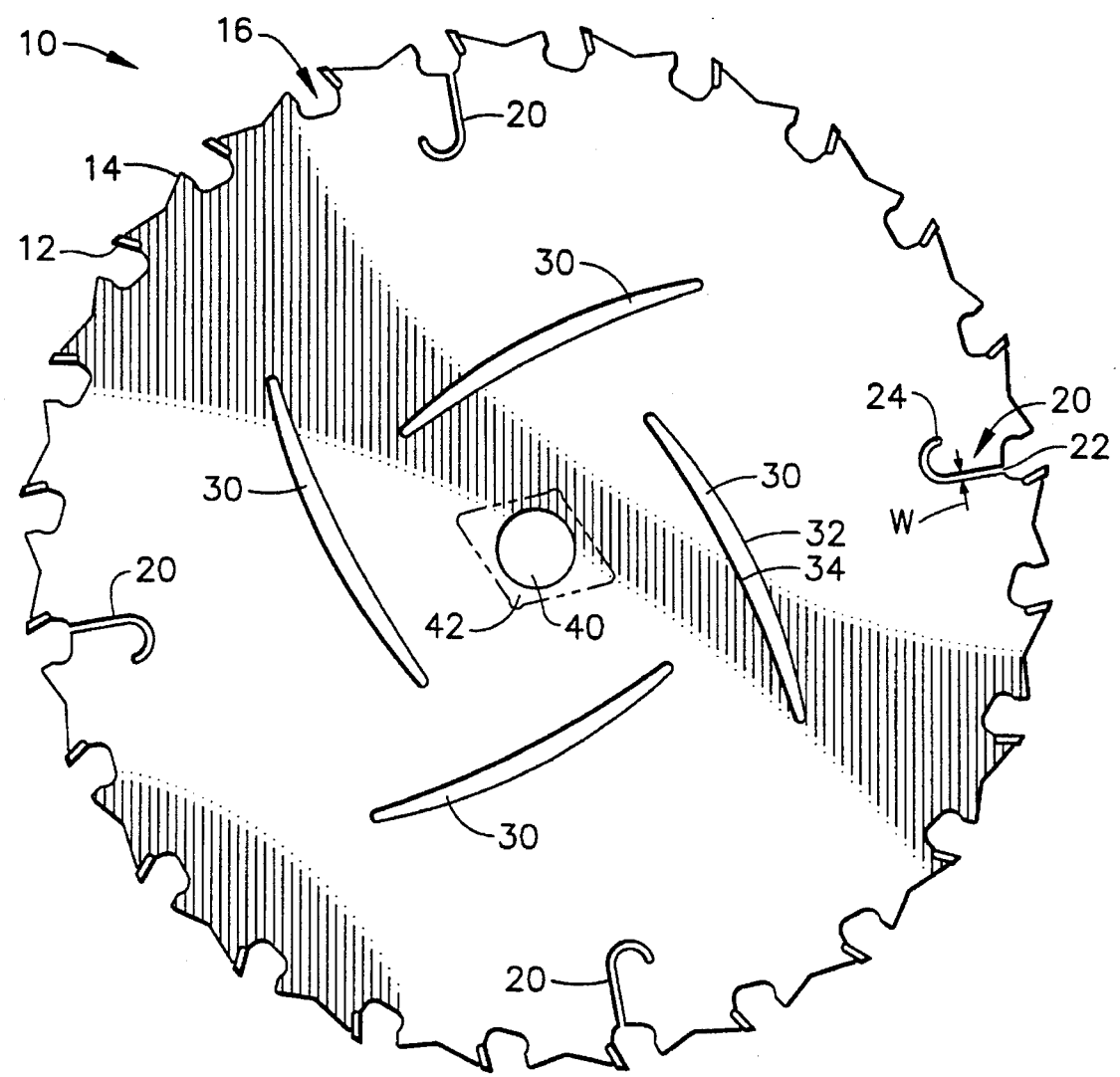
FIG. 43 shows a front view of the saw blade of FIGS. 1–7, identifying selected blade characteristics; and, FIG. 44 shows a front view of the saw blade of FIGS. 8–14, identifying heat distribution characteristics.

FIG. 43 shows a preferred saw blade 10 having a plurality of expansion slots 20 having a "J" shape and a plurality of arced body slots 30. Blade 10 has a center circular arbor receiving bore 40. Blade 10 has a diamond shaped knock out 42 in case the blade is to be placed on a diamond shaped arbor. Knock outs of various shape, diamond, circular, etc. are known.

Blade 10 has carbide cutting tips 12, which are generally at a hook angle of from 0° and greater, for example, 0°, 20°, 35°, the hook angle being the angle between a saw blade radial line and a line along the tip face. The hook angle of blade 10 is 20°. Blade 10 contains anti-kickback portions 14.

For example, blade 10 has a diameter from cutting tip 12 to diametrically opposed cutting tip of 8.250 inches (20.955 cm) and a diameter from anti-kickback portion 14 to diametrically opposed anti-kickback portion 14 of 8.149 inches (20.698 cm).

Blade 10 contains a plurality of gullets 16. The blade 10 shown has 24 tips 12. Equally spaced every 6 gullets 16 is a "J" shaped expansion slot 20 having a uniform width "w". The blade 10 has a blade thickness of 0.064 inch (0.163 cm). Preferably, for ease of manufacture, the slots 20 are punched or stamped out of the blade blank. Therefore, the slot width "w" has a lower value of about equal to the blade 10 thickness. As shown, slot 20 has a width "w" equal the blade thickness of 0.064 inch (0.163 cm).

Slots 20 have a radial portion 22 and an arcuate or semi-circular portion 24. It is preferable that the ratio of diameters of a first concentric circle touching the closest points of the J slots 20 to the center bore 40 and a circle equal blade diameter be in a preferable range of about 0.72 to 0.77 and a general range of 0.7 to 0.8. With blade 10 of FIG. 43, the ratio is 6.27/8.25=0.76. Also, preferably, from where a J slot starts in its respective gullet, the "J" extends inward a distance equal to approximately the blade diameter divided by twelve, or radius divided by six.

Body slots 30 have an outer curve 32 and an inner curve 34. Curve 32 has a first radius and curve 34 has a different second radius. Each slot 30 is symmetric, in that the "center points" of the "circles" which form curves 32 and 34 of each slot 30 would line on a line which would bisect the slot 30. For example, outer curve 32 of blade 10 of FIG. 43 has a radius of 4.830 inch (12.27 cm) and inner curve 34 has a radius of 8.540 inch (21.69 cm). The blades of FIGS. 1–7, 8–14, and 22–28 have these dimensions with a linear distance between the two distant points of the slot 30 of about 2.7 inch (6.9 cm). The smaller diameter blade, as detailed later, of FIGS. 36–42 has an outer curve 32 radius of 5 inch (12.7 cm) and an inner curve 34 radius of 11 inch (28 cm) and a linear distance between the two distant points of the slot 30 of about 2.4 inch (6.1 cm).

If radial lines were drawn to connect two adjacent J slots 20, a body slot 30 would have its location closest to the outer circumference of the blade at a blade position near the bisector or these radial lines. Slots 30 arc inward, but do not arc toward the center bore 40.

It was previously mentioned that a first concentric circle touched the closest points of the J slots 20 to the center bore 40. A second concentric circle touches all body slots 30 at their closest location to the blade 10 circumference and a third concentric circle touches all body slots at their location closest to center bore 40. This third concentric circle is sized to have a diameter slightly larger than the operational collar which will engage the blade. For example, a collar may have a 2 inch (5.1 cm) diameter. As shown with blade 10 of FIG. 43, the first concentric circle has a diameter greater than that of the second concentric circle. However, for the blade of FIGS. 8–14, the second concentric circle has a diameter greater than that of the first concentric circle.

The characteristics of the various blades are:

| Blade of Fig No. | Blade diameter | # teeth | hook angle | blade thickness | # J's 20 | # slots 30 |
|---|---|---|---|---|---|---|
| 1–7 and 43 | 8.25 in 20.96 cm | 24 | 20° | .064 in .163 cm | 4 | 4 |
| 8–14 | 7.25 in 18.42 cm | 24 | 20° | .048 in .122 cm | 3 | 3 |
| 15–21 | 10 in 25.4 cm | 24 | 20° | .080 in .203 cm | 4 | 0 |
| 22–28 | 7.25 in 18.42 cm | 40 | 20° | .048 in .122 cm | 4 | 4 |
| 29–35 | 10 in 25.4 cm | 60 | 0° | .064 in .163 cm | 4 | 0 |
| 36–42 | 6.5 in 16.5 cm | 18 | 20° | .048 in .122 cm | 3 | 3 |

The characteristics of the J shaped expansion slots 20 are:

| Blade of Fig No. | # J's 20 | J width "w" | J radial portion 22 length | J arcuate portion 24 radius | Ratio diameters J circle ÷ blade |
|---|---|---|---|---|---|
| 1–7 and 43 | 4 | .064 in .163 cm | .453 in 1.15 cm | .187 in .475 cm | .76 |
| 8–14 | 3 | .050 in .127 cm | .465 in 1.18 cm | .160 in .406 cm | .74 |
| 15–21 | 4 | .080 in .203 cm | .600 in 1.52 cm | .224 in .569 cm | .77 |
| 22–28 | 4 | .050 in .127 cm | .497 in 1.26 cm | .160 in .406 cm | .74 |
| 29–35 | 4 | .064 in .163 cm | .588 in 1.49 cm | .224 in .569 cm | .77 |
| 36–42 | 3 | .050 in .127 cm | .375 in 0.95 cm | .160 in .406 cm | .74 |

Figure 44:
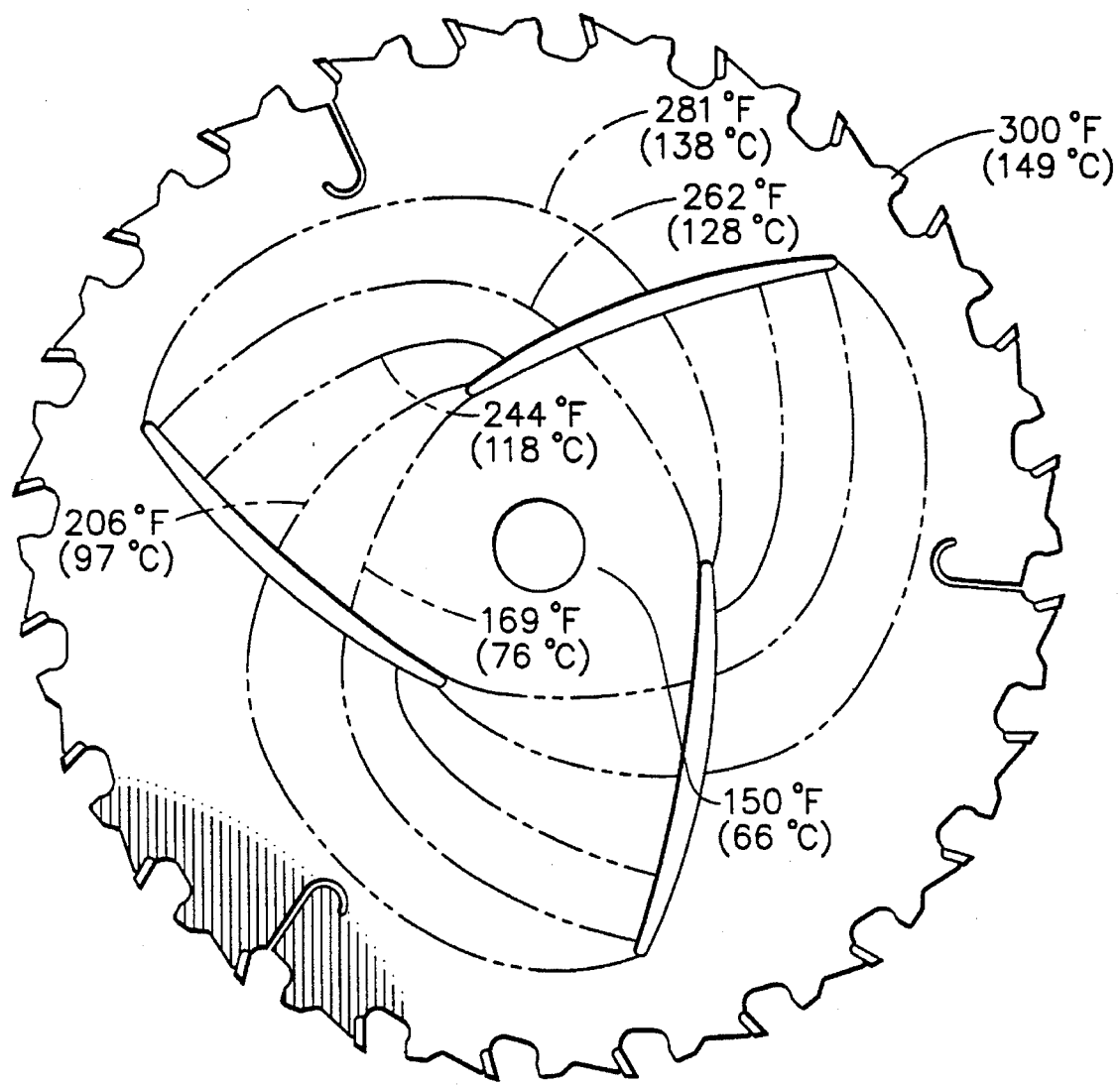

In the preferred embodiment, the invention includes the symmetrical allocation of a preselected number of curvilinear expansion slots 20 and a preselected number of body slots 30, critically placed on the surface of the blade 10, whereby the exhibited thermal gradient encountered during the operation of the blade is maximized, thereby avoiding concentrations of thermal stresses during use, and, at the same time, maintaining the minimum number of expansion and body slots, so that the vibrational performance characteristics of the blade are maintained. For a blade having three J slots and 3 body slots, FIG. 44 shows the temperature at various blade locations. The cutting tips are at 300° F. (149° C.) and the blade center is at 150° F. (66° C.). The lines represent selected temperatures therebetween, 281° F. (138° C.), 262° F. (128° C.), 244° F. (118° C.), 206° F. (97° C.), and 169° F. (76° C).

It was previously mentioned that, particularly with portable saws, the user does not always saw in a straight line and, therefore, generates extra heat which results in buckling (wobbling) and causes more binding. Applicants have found that by coating the blade with a paint containing about ten percent "TEFLON", heat generation is reduced and there is less binding. As an example, a normal steel blade with a load of approximately 10 pounds (4.5 kilograms) may heat up the blade side to over 250° F. (121° C.) while cutting; a similar blade coated with a paint having 10% "TEFLON" and subjected to the same side loading may heat up to only about 180° F.–190° F. (82° C.–88° C.). The cooler blade has less tendency to buckle and, therefore, the saw motor has to use less torque to cut.

The foregoing detailed description is given primarily for clearness of understanding and no unnecessary limitations are to be understood therefrom for modifications will become obvious to those skilled in the art upon reading this disclosure and may be made without departing from the spirit of the invention or the scope of the appended claims.

What is claimed is:

1. A blade for a circular saw, comprising: a body of a generally circular shape, said body having a preselected blade thickness, said body having a peripheral surface having a preselected shape, said peripheral surface having a plurality of cutting teeth connected thereto for cutting in a cutting direction, said blade having a center arbor bore therethrough, said blade having an imaginary blade center point, said blade having at least three and not more than four identical J-shaped expansion slots therein, said J-shape expansion slots having an equal spacing therebetween about said peripheral surface, each said J-shaped expansion slot having a preselected opening width, said opening width being at least equal to said blade thickness, each said J-shaped expansion slot having a radial portion and an arcuate portion, said radial portion extending radially inward from said peripheral surface toward said imaginary blade center point for a preselected distance to a closest radial location, said arcuate portion starting at said closest radial location and arcing in said cutting direction, said arcuate portion having a preselected radius and an imaginary arc center point, said imaginary arc center point having a blade location between said peripheral surface and said arcuate portion and in said cutting direction from said radial portion, said arcuate portion having a J-shaped expansion slot closest location to said imaginary blade center point.

2. The blade of claim 1, where, said plurality of cutting teeth are a first preselected distance from said imaginary blade center point and said J-shaped expansion slot closest locations to said imaginary blade center point are a second preselected distance from said imaginary blade center, said second preselected distance from said imaginary blade center divided by said first preselected distance from said imaginary blade center point defining a ratio, said ratio having a value of at least 0.7 and not more than 0.8.

3. The blade of claim 2, wherein said blade body has a coating thereon, said coating including "TEFLON".

4. The blade of claim 3, where said "TEFLON" comprises at least ten percent of said coating.

5. The blade of claim 1, where said blade body has a coating thereon, said coating including "TEFLON".

6. The blade of claim 5, where said "TEFLON" comprises at least ten percent of said coating.

7. The blade of claim 1, said blade further comprising at least three and not more than four identical body expansion slots therein, said blade having an equal number of said J-shaped expansion slots and said body slots, said body slots having a symmetrical spacing therebetween about said body, each said body slot having an outer curved portion and an inner curved portion and opposed end portions joining said outer and inner curved portions, said outer curved portion having a preselected outer curved portion radius and said inner curved portion having a preselected inner curved portion radius, said inner curved portion radius being greater than said outer curved portion radius, said inner curved portion radius identifying a first imaginary slot curve center point and said outer curved portion radius identifying a second imaginary slot curve center point, said first and said second imaginary slot curve center points being on an imaginary line bisecting said body slot inner and outer curved portions.

8. The blade of claim 7, where, for each of said J-shaped expansion slots, on a respective imaginary line connecting one of said J-shaped expansion slot radial portions and said imaginary blade center point, said imaginary line intersects no more than one of said body slots.

9. The blade of claim 8, where each of said body slots have a location closest said peripheral surface and a location closest said imaginary blade center point, said locations closest said peripheral surface being on a circumference of a first imaginary circle, said locations closest said imaginary blade center point being on a circumference of a second imaginary circle, said first and said second imaginary circles being concentric circles having said imaginary blade center point as a common center point.

10. The blade of claim 7, where said J-shaped expansion slots and said body slots are formed by punching.

11. The blade of claim 7, where said blade body has a coating thereon, said coating including "TEFLON".

12. The blade of claim 11, where said "TEFLON" comprises at least ten percent of said coating.

13. The blade of claim 1, where said J-shaped expansion slots are formed by punching.

* * * * *